United States Patent [19]

Cabrerizo-Pariente

[11] Patent Number: 5,725,226
[45] Date of Patent: Mar. 10, 1998

[54] DAMPED BICYCLE FORK WITH FLOATING PISTON, DIVERSE FLUIDS AND MECHANICAL BLOCKING

[76] Inventor: Antonio Cabrerizo-Pariente, Pintor Ignacio Díaz de Olano, 11 bajo 01008 Vitoria (Alava), Spain

[21] Appl. No.: 544,506

[22] Filed: Oct. 18, 1995

[30] Foreign Application Priority Data

Oct. 18, 1994 [ES] Spain .................................. 9402642

[51] Int. Cl.⁶ ................................................ B62K 25/00
[52] U.S. Cl. ...................... 280/276; 280/284; 267/64.12; 267/64.26; 188/300
[58] Field of Search ........................ 280/275, 276, 280/277, 284; 188/269, 300, 297; 267/64.12, 64.26

[56] References Cited

U.S. PATENT DOCUMENTS

| | | | |
|---|---|---|---|
| 3,563,349 | 2/1971 | Speith | 188/300 |
| 4,632,228 | 12/1986 | Oster et al. | 188/300 |
| 4,807,860 | 2/1989 | Simons | 280/276 |
| 4,856,762 | 8/1989 | Selzer | 188/269 |
| 5,097,928 | 3/1992 | Enders et al. | 188/300 |

FOREIGN PATENT DOCUMENTS

| | | | |
|---|---|---|---|
| 1291568 | 3/1969 | Germany | 188/269 |
| 1581929 | 7/1990 | Russian Federation | 267/64.12 |
| 9303359 | 12/1993 | Spain . | |

*Primary Examiner*—Brian L. Johnson
*Assistant Examiner*—Gary Savitt
*Attorney, Agent, or Firm*—Klauber & Jackson

[57] ABSTRACT

A fork capable of absorbing the vibrations produced by the irregularities of the ground where a bicycle travels. In this way, vibrations do not end up being transmitted to the bicyclist's hands and arms, which is an advantage over conventional bicycles having rigid forks. The fork includes in each one of its two vertical arms or branches a shock absorber that comprises a group of elements that operates by means of oil and a gaseous fluid. Located between these elements is a floating piston that separates an oil chamber from the other gaseous fluid chamber. The fork includes a mechanical blocking system whose structure and functioning are very simple.

2 Claims, 3 Drawing Sheets

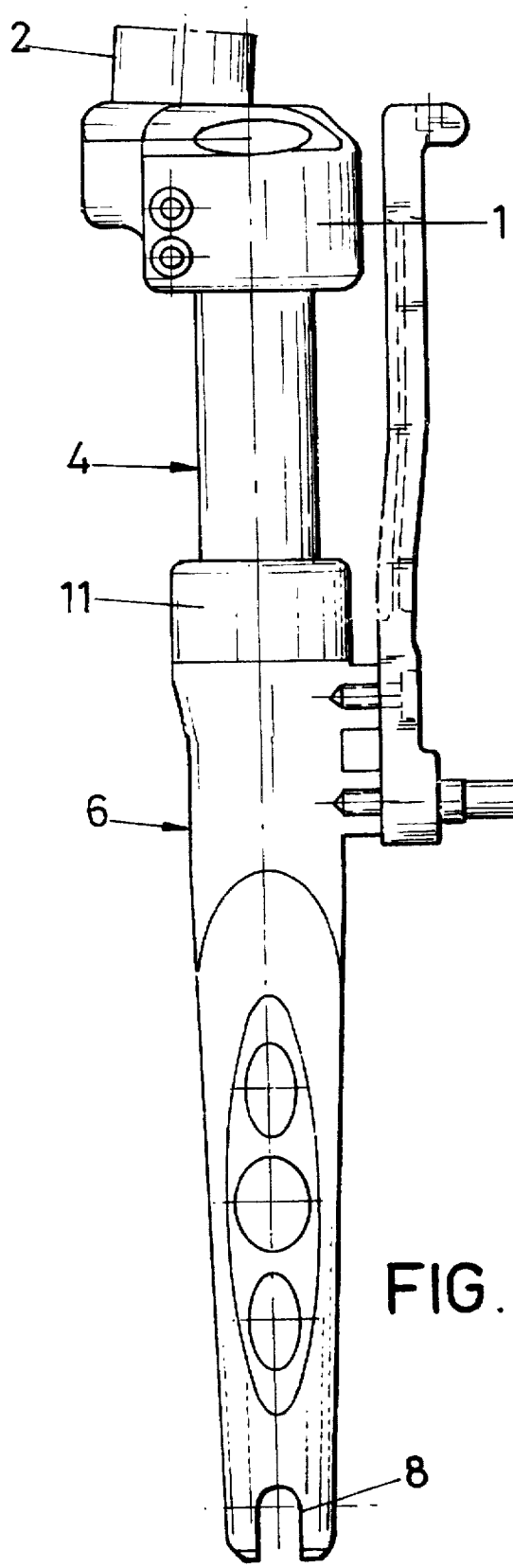
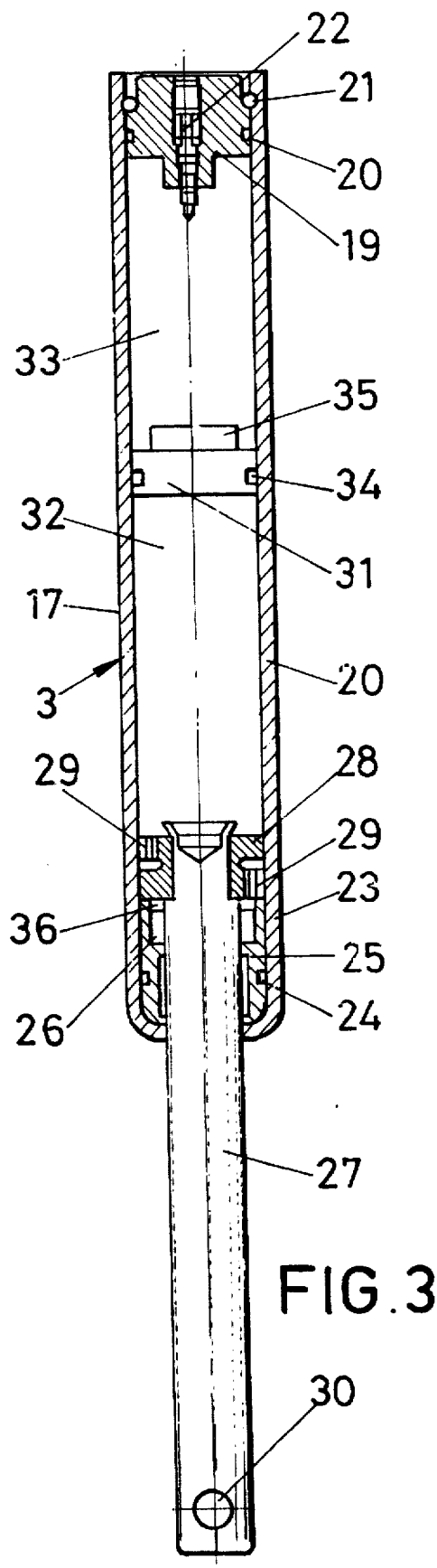
FIG. 2
FIG. 3

DAMPED BICYCLE FORK WITH FLOATING PISTON, DIVERSE FLUIDS AND MECHANICAL BLOCKING

OBJECT OF THE INVENTION

As expressed in the title of this specification, the present invention refers to a damped bicycle fork, which advantageously absorbs the vibrations produced by the irregularities of the ground, in such a way that said vibrations do not end up being transmitted to the bicyclist's hands and arms, contrary to that which happens conventionally. For this purpose, the fork of the invention includes damping by means of two autonomous elements, that operate by means of oil and a gaseous fluid, which makes bicycle riding very gentle.

On the other hand, the possibility of blocking the damping system has been provided for, mainly when one goes up a slope.

The fork of the invention includes a series of important modifications in connection with the fork of SPANISH Utility Model no. 9303359, centering the same in the structure, obtaining as a result some noteworthy advantages in the assembly and also in operation.

BACKGROUND OF THE INVENTION

Presently some shocking absorbing devices used in industry and especially in the automotive field are known, all of them having as their purpose the absorption of the energy of the vibrations produced by the irregularities of the ground.

On the other hand there are shocking absorbing devices for bicycles, which are comprised of steel or rubber springs, and also of a combination of steel springs and oil.

Hence, all the dampings in which mechanical elastic elements are used, the vibrations produced are not totally absorbed. Then the same are transmitted to the structure of the machine or any other mechanism that includes shock absorbers. In the case of a bicycle, these vibrations are transmitted to the muscles of the bicyclist's hands and arms.

The damped bicycle fork corresponding to Spanish Utility Model no. 9303359 includes two fluids (oil and nitrogen gas) of different densities in order to achieve gentle damping, preventing the vibrations of the bicycle from being transmitted to the bicyclist. Of course, these fluids are housed in some respective chambers.

DESCRIPTION OF THE INVENTION

The damped bicycle fork that comprises the object of the invention includes some relevant characteristics, especially due to its capacity to totally absorb the vibrations produced by the irregularities of the ground, without said vibrations ending up being transmitted to the muscles of the bicyclist's hands and arms, thus avoiding premature fatigue of the same.

In the fork of the invention, the mechanical parts have been advantageously replaced by fluids, such as oil and nitrogen, which carry out a complete absorption of the energy produced by the vibrations when riding the corresponding bicycle. On the other hand, the fork of Spanish Utility Model no. 9303359, also includes damping by means of two fluids, a liquid and the other a gas, though the fork of the invention includes some structural advantageous characteristics that have a very positive effect on riding and operation.

The vertical supports corresponding with the two parallel branches of the U-shaped fork are made from a main tube, which in itself is an autonomous element which is very easy to assemble and disassemble, the entire shock absorbing system being included inside the same. Said main tube is fastened by its top end to the cross member or bridge of the cited fork and the rod of the autonomous element is fastened by its bottom part to the vertical supports.

On the other hand, the main tube along which the autonomous element moves fits telescopically in the hole of the parallel branches of the fork with insertion of sliding bush, this latter element having in its bottom part a ribbed extension to facilitate coupling of the front wheel of the bicycle.

The autonomous element converts into the authentic shock absorber, and mainly consists of an external body, that acts as the main shaft of the fork, housing inside it two independent chambers, the top one with pressurized nitrogen gas and the bottom one with hydraulic oil. In the top part of the main shaft, a fixed head that supports the gas filling valve is housed and in the bottom part thereof there is another fixed head, which houses the sealing gasket and that has a hole in it through which a telescopic shaft slides. When the shaft is inserted towards the inside of the main body, the oil is forced through several holes into a third chamber, absorbing the impact. When the impact stops the pressurized gas pushes the oil to its initial position, by means of a floating ram.

With the described arrangement, when one rides the bicycle, the impacts of potholes, as well as vibrations, will be advantageously entirely absorbed by the shock absorbing system of the fork of the invention. Then upward and downward vertical alternating movement is produced towards the main tubes joined to the ribbed extension that is coupled to the axle of the bicycle wheel.

One of the advantages added to this shock absorbing system described is the ease for the bicyclist to get on or get off the bicycle, to choose the gentleness of the damping, which is achieved by means of different holes for intercommunication of the oil and filling pressure of the nitrogen gas.

Finally, a device to block the shock absorbing system has been provided for, mainly when one is to go uphill.

Hereinafter to provide a better understanding of this specification and forming an integral part of the same, a series of figures wherein the object of the invention has been represented in an illustrative and non-restrictive manner, is attached hereto.

BRIEF DESCRIPTION OF THE DRAWINGS

FIG. 2 is a profile view of the fork of the invention.

FIG. 3 is a raised section view of one of the two autonomous and independent supports corresponding to each one of the U-shaped branches of the fork unit of the bicycle.

DESCRIPTION OF THE PREFERRED EMBODIMENT

Figure 1:
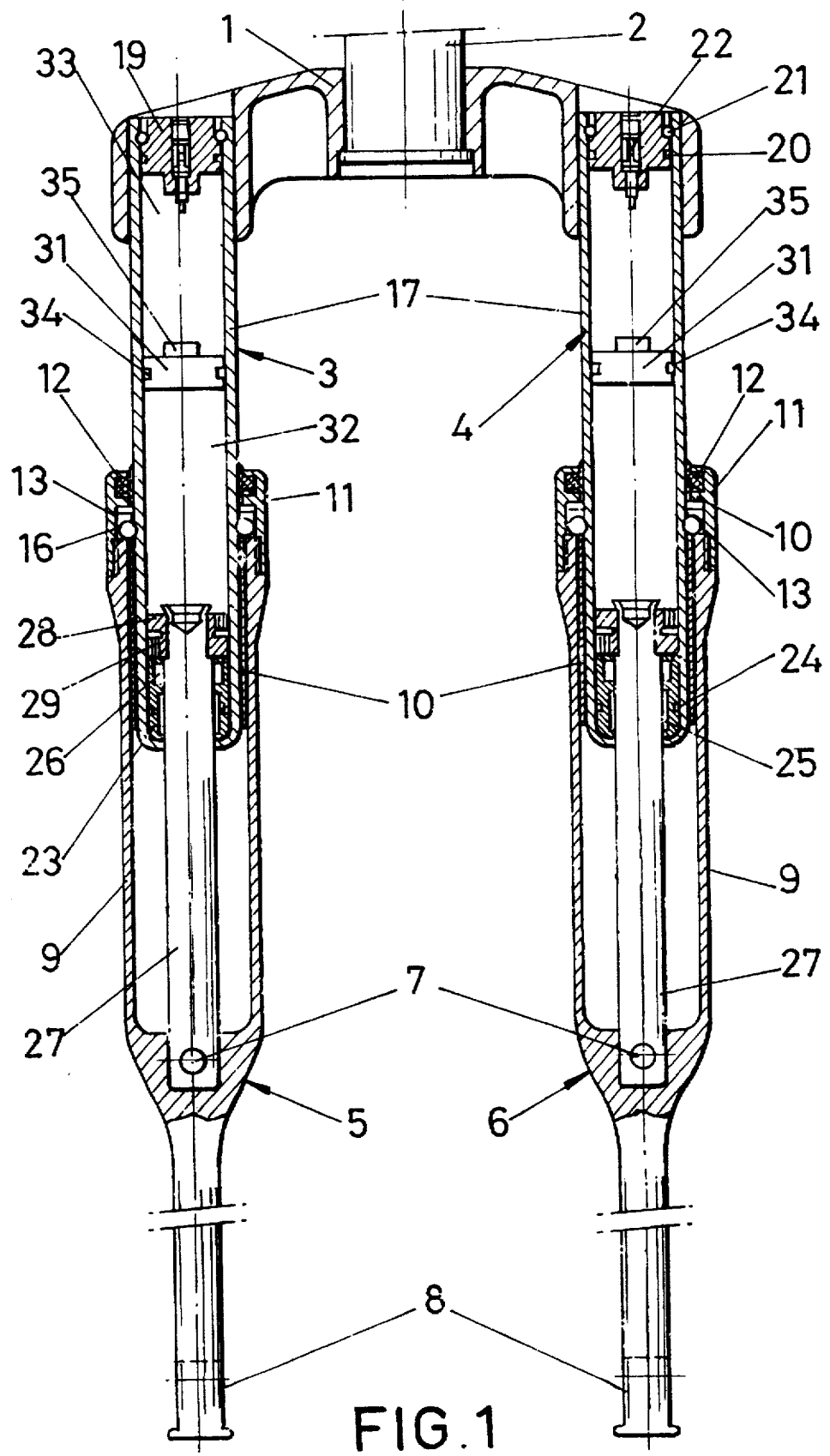
FIG. 1 is a front sectioned view of the damped bicycle fork, object of the invention.
Figure 4:
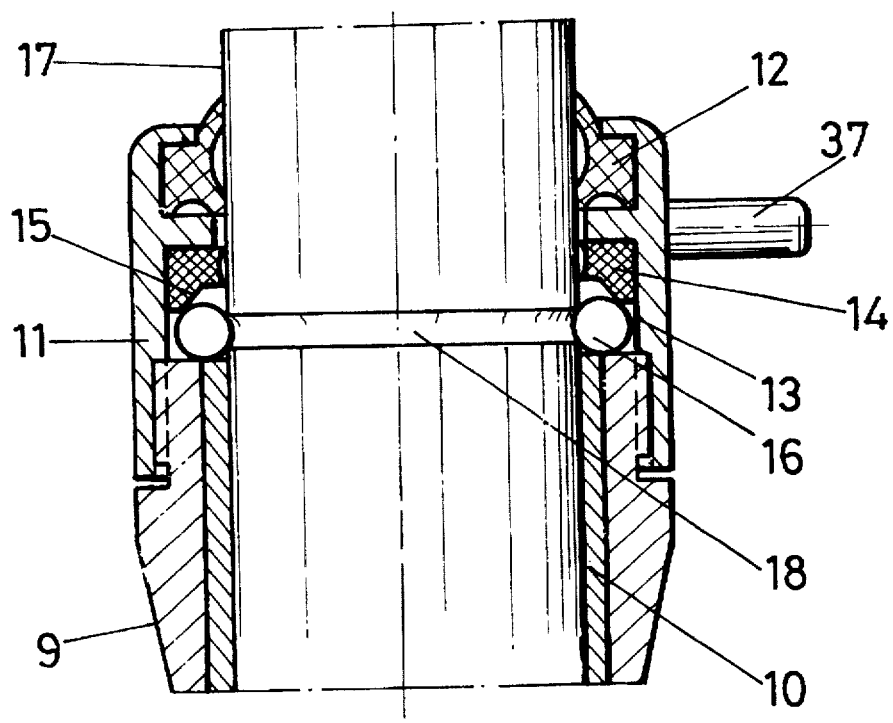
FIG. 4 is a section view of the blocking mechanism unit in the anchoring position, belonging to the fork of the invention.
Figure 5:
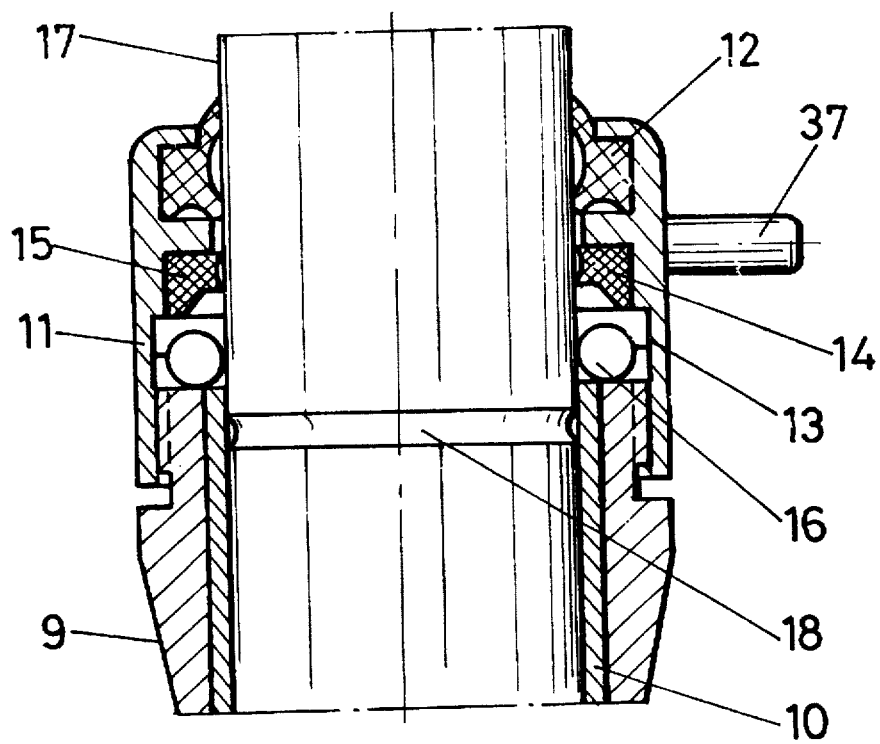
FIG. 5 is a view similar to the previous one, in the unblocked position, so that the shock absorbers of the bicycle fork can thus operate.

Referring to the numbers used in the figure, the damped bicycle fork comprises a bridge (1) in whose top center part a part (2) that is connected to the handbars of the bicycle is connected, while in the ends of said bridge (1) two easily dismountable autonomous or independent vertical supports (3) and (4), which are telescopically coupled to some bottom elements (5) and 6) with the help of some pins (7), are connected.

The bottom elements (5) end (6) include in their lowest end, some recesses (8) for coupling the axle of the bicycle wheel, while the top part is defined by a cylindric-tube-shaped section (9), inside of which the autonomous vertical supports (3) and (4) are housed and inserted telescopically, with insertion of some bushes (10) pressed against the inside surface of the cylindric-tube-shaped sections (9). In the top edge of the bottom elements (5) and (6) some nuts (11) provided with a ring-shaped indentation where a scraper (12) adjusts to prevent the passing of strange objects inside the shock absorber unit, are threaded. Besides, said nut includes a ring-shaped recess (13) wherein a ring (14) provided with a conical inside surface (15) capable of contacting with some small balls (16) that are also located in this ring-shaped recess (13), is located. The balls rest on the horizontal flat edge of the cylindric-tube-shaped sections (9) of the bottom elements (5) and (6.)

On the other hand, the autonomous supports (3) and (4) are defined by a cylindric tube (17) provided with an arched section external groove (18), at the same time that said tube adjusts inside the bush (10) fit in the tube-shaped sections (9) belonging to the bottom elements (5) and (6), the respective scraper (12) contacting against the external surface of said cylindric tube (17). The top end of the cited cylindric tube (17) where connection to the bridge (1) of the bicycle takes place, is closed by a cap (19) that includes an Or-ing seal (20), a locking ring (21) and a nitrogen gas filling valve (22). In the bottom end of the cylindric tube (17) there is a tube-shaped part (23) adjusted against the inside surface of the same, at the same time that this part (23) includes an Or-ing seal (24), as well as a guide bush (25) and a sealing gasket (26.) Adjusting against this gasket and the guide bush (25) there is a vertical rod (27) to whose top end a piston (28) capable of moving axially inside the cylindric tube is fastened, this piston (28) having some longitudinal holes (29) to allow the flow of oil. The bottom end of said vertical rod (27) has a hole (30) to permit connection of said rod (27) to the corresponding independent element (5) and (6) by means of the pin (7).

On the other hand, inside the cylindric tube (17) of the autonomous supports (3) and (4) there is a floating piston (31) that separates a bottom oil chamber (32) and a top nitrogen gas chamber (33). The floating piston (31) includes a sealing gasket (34), as well as a screw (35) for purging air (35.)

With the described arrangement, when there is an external force on the handlebars of the bicycle due to the irregularities of the ground or any other reason, the cylindric tube (17) will drop downward, while the bottom elements (5) and (6) will go upward, drawing in the movement thereof the rods (27) and both rams (28) connected to the same, whereby, the floating piston will move upward, thus reducing the volume of the nitrogen gas chamber (33) and increasing the pressure of the same. At the same time that this happens, part of the oil will pass to the bottom area of the bottom chamber (32) through the holes of the piston (28) fastened to the rod (27), right at the cavity (36) existing under said piston (28).

When this external force ceases, then the different elements of the damped fork will tend to recover their initial position.

The damped fork is provided with an advantageous mechanical blocking system, defined by the balls (16), the ring (14), the external arched-section groove (18) and the nut (11) to which a handling pivot (37) of the same is integral in order to release and anchor the blocking system, the ring (14) also having some longitudinal grooves to house both balls (16). Hence, when one wants to block the damping unit, once the balls are facing each other and at the same height as the outside groove (18), then the nut (11) will be turned by means of the handling pivot (37), whereby the conical surface (15) of the ring (14) will push the balls (16) against he external arched-section groove (18) belonging to the cylindric tube (17) of the automonus supports (3) and (4). In this way, the shock absorber unit will remain totally stiffened.

In order to proceed to deblock the same, one need only turn the nut (11) in the opposite direction in which it was turned to block same, whereby the balls (16) will no longer press on the external groove (18) of the cylindric tube (9).

I claim:

1. A damped bicycle fork, being of the type that is comprised of a bridge (1), to whose ends a plurality of parallel frames are connected, each one of the frames being defined by a vertical support (3 or 4) and a bottom element (5 or 6) both coupled telescopically; the vertical support comprising a first cylindric tube (17) connected at its top to the bridge (1) while the bottom part of the first cylindric tube (17) is inserted into a second cylindric tube (9) of the bottom element, screwed into a top portion of the second cylindric tube (9) is a nut ( 11 ) provided with a scraper (12), that contacts against the external surface of the first cylindric tube (17), inside of the first cylindric tube (17), is a floating ram or piston (31 ) that separates two chambers, a top nitrogen gas chamber (33) and a bottom oil chamber (32), the first cylindric tube (17) closing in its top part by a cap (19) that comprises a nitrogen gas filling valve (22); a damping blocking system is connected to the nut (11) in the top portion of the second cylindric tube (9); each vertical support is autonomous and independent and each vertical support includes a rod (27), through a top end of the rod (27) a piston (28) is adjusted against a side inside surface of the oil chamber of the first cylindric tube (17), a tube shaped part (23) provided with an O-ring seal, as well as a sealing gasket (26) and a guide bush (25) are all disposed in the bottom part of the first cylindric tube (17); the rod (27) contacts with the sealing gasket (26) and connects to the lower portion of the bottom element (5 or 6) by means of a pin (7), the piston (28) is fastened to the top end of the rod (27) and has a plurality of through holes (29).

2. A damped bicycle fork, according to claim 1, characterized in that the blocking system is defined by a ring (14) located in a ring-shaped recess (13) of the nut (11), also housed in the nut (11) are a plurality of balls (16), which, when blocking is to take place, will face an external arched-section groove (18) made in the first cylindric tube (17), an inside conical surface (15) of the ring (14) can make contact with the plurality of balls (16), upon the nut (11) turning in a required direction by means of a handling pivot (37), the balls are then pushed by said ring (14), and the balls will then fit in said outside groove (18); the blocking system being capable of being unblocked by turning the nut (11) in an opposite direction of the required direction.

* * * * *